United States Patent
Hassan et al.

(10) Patent No.: US 7,691,953 B2
(45) Date of Patent: Apr. 6, 2010

(54) SYSTEM AND PROCESS FOR PRODUCTION OF POLYVINYL CHLORIDE

(75) Inventors: Abbas Hassan, Sugar Land, TX (US); Ebrahim Bagherzadeh, Sugar Land, TX (US); Rayford G. Anthony, College Station, TX (US); Gregory Borsinger, Chatham, NJ (US); Aziz Hassan, Sugar Land, TX (US)

(73) Assignee: H R D Corporation, Houston, TX (US)

( * ) Notice: Subject to any disclaimer, the term of this patent is extended or adjusted under 35 U.S.C. 154(b) by 0 days.

(21) Appl. No.: 12/141,193

(22) Filed: Jun. 18, 2008

(65) Prior Publication Data
US 2009/0005521 A1    Jan. 1, 2009

Related U.S. Application Data

(60) Provisional application No. 60/946,461, filed on Jun. 27, 2007.

(51) Int. Cl.
*C08F 2/01* (2006.01)
*C08F 2/02* (2006.01)
*C08F 14/06* (2006.01)

(52) U.S. Cl. .............. 526/88; 526/344; 526/344.1; 526/344.2; 526/227; 526/229; 526/230; 526/230.5; 526/232.1; 366/241; 422/135

(58) Field of Classification Search ............... 526/88, 526/344, 344.1, 344.2; 524/457; 523/333
See application file for complete search history.

(56) References Cited

U.S. PATENT DOCUMENTS

| | | | |
|---|---|---|---|
| 4,071,670 A * | 1/1978 | Vanzo et al. | 526/88 |
| 4,105,584 A * | 8/1978 | Norback et al. | 502/5 |
| 4,245,070 A * | 1/1981 | Kemp | 526/75 |
| 4,355,142 A | 10/1982 | Khungar et al. | |
| 5,292,836 A | 3/1994 | Kitamura et al. | |
| 5,294,684 A | 3/1994 | Kaneko et al. | |
| 5,922,509 A * | 7/1999 | Kautz et al. | 430/281.1 |
| 6,177,525 B1 * | 1/2001 | McKee et al. | 526/87 |

FOREIGN PATENT DOCUMENTS

| | | | |
|---|---|---|---|
| DE | 2618761 | * | 11/1976 |
| EP | 1277765 A1 | | 1/2003 |
| JP | 03-197504 A | | 8/1991 |

(Continued)

OTHER PUBLICATIONS

IKA 2003 Process Catlog.*
Polymers and polyfunctionality. Carothers, W., Trans. Faraday Soc. 1936, 32 39-49.*

(Continued)

*Primary Examiner*—Vasu Jagannathan
*Assistant Examiner*—Richard A Huhn
(74) *Attorney, Agent, or Firm*—Conley Rose, P.C.

(57) ABSTRACT

A method is disclosed for producing polyvinyl chloride which includes mixing a vinyl chloride solution with an initiator solution in at least one high shear mixing device comprising at least one rotor/stator set producing a rotor tip speed of at least 5.1 m/sec (1000 ft/min), to form a polymerization mixture; and allowing the mixture to polymerize by free radical polymerization to form polyvinyl chloride. The polymerization mixture may be subjected to free radical polymerization conditions comprising a temperature in the range of about 20° C. to about 230° C. In some embodiments, the high shear mixing device produces a shear rate of at least 20,000 $s^{-1}$. A system for carrying out the method is also disclosed.

13 Claims, 2 Drawing Sheets

FOREIGN PATENT DOCUMENTS

JP          05-310806 A     11/1993
JP          12-290308 A     10/2000

OTHER PUBLICATIONS

"Carothers equation" retrieved on Nov. 5, 2009 from the Wikipedia website http://en.wikipedia.org/wiki/Carothers_equation.*

"Carother's equation" retrieved on Nov. 5, 2009 from the Polymer Chemistry Hypertext website http://www.polymerchemistry-hypertext.com/CarothersEquation.htm.*

International Search Report, International Application No. PCT/US2008/067832, dated Dec. 24, 2008.

* cited by examiner

SYSTEM AND PROCESS FOR PRODUCTION OF POLYVINYL CHLORIDE

CROSS-REFERENCE TO RELATED APPLICATIONS

This application claims the benefit under 35 U.S.C. §119 (e) of U.S. Provisional Patent Application No. 60/946,461 filed Jun. 27, 2007, the disclosure of which is hereby incorporated herein by reference.

STATEMENT REGARDING FEDERALLY SPONSORED RESEARCH OR DEVELOPMENT

Not Applicable.

TECHNICAL FIELD

The present invention generally relates to the liquid phase polymerization of vinyl chloride to form polyvinyl chloride. More particularly, the invention relates to apparatus and methods for producing polyvinyl chloride which employ high shear mixing of the reactants.

BACKGROUND

Polyvinyl chloride (PVC) is a thermoplastic polymer that is widely used in the manufacture of a variety of commercial products, including building materials, plumbing pipe, clothing, upholstery, flooring and vinyl records, to name just a few examples. PVC is synthesized by free radical polymerization of vinyl chloride monomer using a monomer-soluble initiator or catalyst. Some of the known initiators are azobisisobutyronitrile, tertiary butyl hydroperoxide, lauroyl peroxide, benzoyl peroxide and isopropylperoxy dicarbonate. A batch suspension preparation generally contains about 0.01 to 1.0 wt % vinyl chloride monomer at a pH of about 7-9. Polymerization is commenced by dissolving the initiator in the monomer solution and heating at a temperature in the range of about 35° to 75° C. for about 2 to 12 hours, with constant agitation of the reactants. The process is completed when one of the detached hydrogen atoms attaches to the unpaired electron at the end of the PVC chain, or when the carbon atoms form a double bond through a process called disproportionation, which results in the free hydrogen atom.

The free radical polymerization of vinyl chloride monomer is generally considered to be the easiest and most economical method today of synthesizing PVC, despite the fact that the polymerization process can also cause impurities and defects in the polymer. Due to the unpredictable nature of free radical polymerization carbon-hydrogen bonds are sometimes broken instead of only the carbon-carbon bonds of the monomers, leading to the occurrence of branching at sites on the growing polymer strand where the carbon-hydrogen bond was broken. Another challenge associated with some PVC synthesis reactions is the amount of unpolymerized monomer that sometimes remains after the polymerization reaction ceases. Many existing processes and production facilities for producing polyvinyl chloride are also subject to various constraints such as mass flow limitations, product yield, plant size and energy consumption. Accordingly, there is continuing interest in developing ways to improve the selectivity and yield of polyvinyl chloride from free radical polymerization of vinyl chloride monomer.

SUMMARY

In accordance with certain embodiments of the invention, a method is provided for producing polyvinyl chloride. The method comprises mixing a vinyl chloride solution with an initiator solution in a high shear mixing device comprising at least one rotor/stator set producing a rotor tip speed of at least 5.1 m/sec (1,000 ft/min), to form a polymerization mixture; and allowing the mixture to polymerize by free radical polymerization to polyvinyl chloride. In some embodiments, the polymerization mixture is subjected to free radical polymerization conditions comprising a temperature in the range of about 20° C. to about 230° C. In some embodiments, the high shear mixing device produces a shear rate of at least 20,000 s$^{-1}$.

In accordance with another embodiment of the invention, a system is provided which comprises a high shear mixing device comprising at least one rotor/stator set configured to yield a rotor tip speed of at least 5.1 m/sec (1,000 ft/min); a pump in fluid communication with an inlet of the high shear mixing device; and a vessel in fluid communication with an outlet of the high shear mixing device and configured for maintaining a predetermined pressure and temperature. In some embodiments, the high shear mixing device produces a shear rate of at least 20,000 s$^{-1}$. These and other embodiments and potential advantages will be apparent in the following detailed description and drawings.

DETAILED DESCRIPTION

The present methods and systems for the production of polyvinyl chloride (PVC), via liquid phase free radical polymerization of vinyl chloride employ an external high shear mechanical device to provide rapid contact and mixing of chemical ingredients in a controlled environment in the high shear mixer device and/or separate reactor. The high shear device reduces the mass transfer limitations on the reaction and thus increases the overall reaction rate.

Chemical reactions involving liquids, gases and solids rely on the laws of kinetics that involve time, temperature, and pressure to define the rate of reactions. In cases where it is desirable to react two or more raw materials of different phases (e.g. solid and liquid; liquid and gas; solid, liquid and gas), one of the limiting factors in controlling the rate of reaction involves the contact time of the reactants. In the case of heterogeneously catalyzed reactions there is the additional rate limiting factor of having the reacted products removed from the surface of the catalyst to enable the catalyst to catalyze further reactants. Contact time for the reactants and/or catalyst is often controlled by mixing which provides contact with two or more reactants involved in a chemical reaction. Homogeneous reactions may also benefit from high shear mixing, as disclosed herein, by at least providing uniform temperature distribution within the reactor and minimizing potential side reactions. Accordingly, in some embodiments, a high shear process as described herein promotes homogeneous chemical reaction(s).

A reactor assembly that comprises an external high shear device or mixer as described herein makes possible decreased mass transfer limitations and thereby allows the reaction to more closely approach kinetic limitations. When reaction rates are accelerated, residence times may be decreased, thereby increasing obtainable throughput. Product yield may be increased as a result of the high shear system and process. Alternatively, if the product yield of an existing process is acceptable, decreasing the required residence time by incorporation of suitable high shear may allow for the use of lower temperatures and/or pressures than conventional processes. In some cases, it may be possible to reduce the reactor size while maintaining the same product yield.

System for Production of Polyvinyl Chloride

Figure 1:
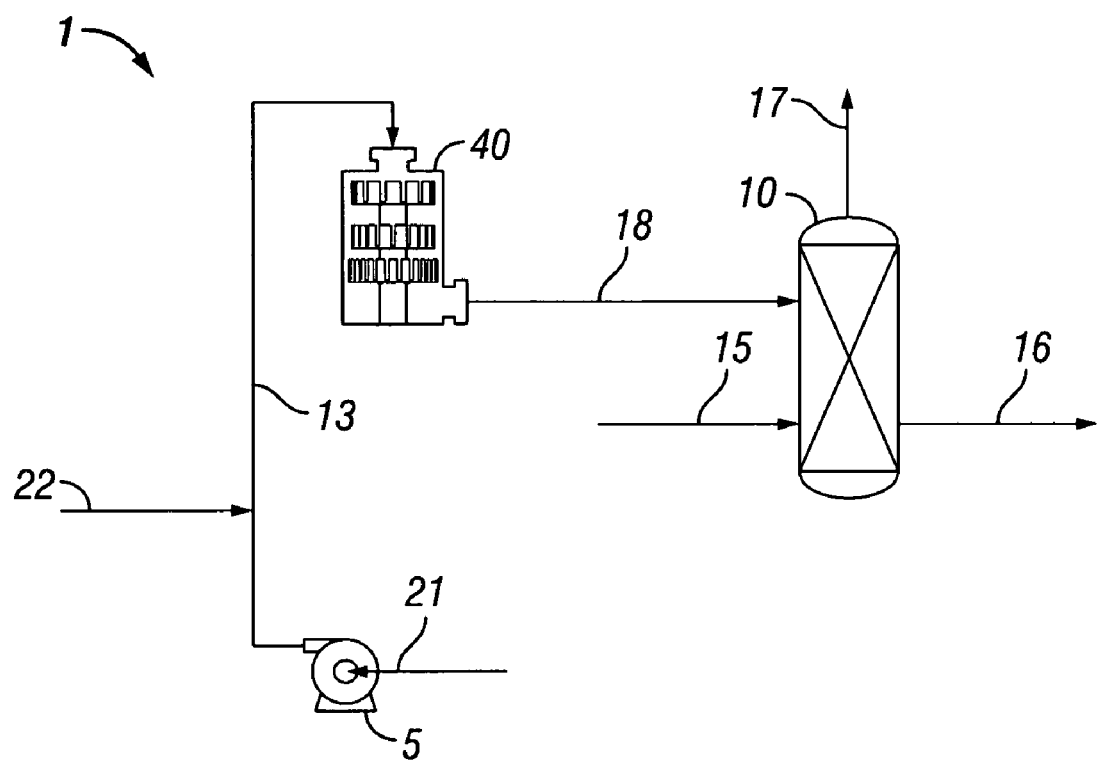
FIG. 1 is a process flow diagram of a process for production of polyvinyl chloride, in accordance with an embodiment of the present invention.

A high shear system will now be described in relation to FIG. 1, which is a process flow diagram showing an embodiment of a high shear system 1 for the production of polyvinyl chloride by catalyzed polymerization of the corresponding monomer. The basic components of the system include external high shear mixing device (HSD) 40, vessel 10, and pump 5. As shown in FIG. 1, the high shear device is located external to vessel/reactor 10. Each of these components is further described in more detail below. Line 21 is connected to pump 5 for introducing the vinyl chloride monomer solution. Line 13 connects pump 5 to HSD 40, and line 18 connects HSD 40 to vessel 10. Line 22 is connected to line 13 for introducing an initiator (e.g., an organic peroxide) or catalyst in a suitable solvent. Line 17 is connected to vessel 10 for removal of vent gas. Additional components or process steps (e.g., recycling of unreacted monomer) may be incorporated between vessel 10 and HSD 40, or ahead of pump 5 or HSD 40, if desired.

High Shear Mixing Device. External high shear mixing device (HSD) 40, also sometimes referred to as a high shear mixer, is configured for receiving an inlet stream via line 13, comprising a monomer and initiator stream. Alternatively, HSD 40 may be configured for receiving the monomer and initiator streams via separate inlet lines (not shown). Although only one high shear device is shown in FIG. 1, it should be understood that some embodiments of the system may have two or more high shear mixing devices arranged either in series or parallel flow. HSD 40 is a mechanical device that utilizes one or more generators comprising a rotor/stator combination, each of which having a fixed gap between the stator and rotor. HSD 40 is configured in such a way that it is capable of producing a dispersion containing submicron (i.e., less than one micron in diameter) and micron-sized particles containing catalyst dispersed in a liquid medium flowing through the mixer. The high shear mixer comprises an enclosure or housing so that the pressure and temperature of the reaction mixture may be controlled.

High shear mixing devices are generally divided into three general classes, based upon their ability to mix fluids. Mixing is the process of reducing the size of particles or inhomogeneous species within the fluid. One metric for the degree or thoroughness of mixing is the energy density per unit volume that the mixing device generates to disrupt the fluid particles. The classes are distinguished based on delivered energy density. Three classes of industrial mixers having sufficient energy density to consistently produce mixtures or dispersions with particle sizes in the range of submicron to 50 microns include homogenization valve systems, colloid mills and high speed mixers. In the first class of high energy devices, referred to as homogenization valve systems, fluid to be processed is pumped under very high pressure through a narrow-gap valve into a lower pressure environment. The pressure gradients across the valve and the resulting turbulence and cavitation act to break-up any particles in the fluid. These valve systems are most commonly used in milk homogenization and can yield average particle sizes in the 0-1 micron range.

At the opposite end of the energy density spectrum is the third class of devices referred to as low energy devices. These systems usually have paddles or fluid rotors that turn at high speed in a reservoir of fluid to be processed, which in many of the more common applications is a food product. These low energy systems are customarily used when average particle sizes of greater than 20 microns are acceptable in the processed fluid.

Between the low energy devices and homogenization valve systems, in terms of the mixing energy density delivered to the fluid, are colloid mills, which are classified as intermediate energy devices. A typical colloid mill configuration includes a conical or disk rotor that is separated from a complementary, liquid-cooled stator by a closely-controlled rotor-stator gap, which is commonly between about 0.0254 mm and about 10.16 mm (about 0.001-0.40 inch). Rotors are usually driven by an electric motor through a direct drive or belt mechanism. As the rotor rotates at high rates, it pumps fluid between the outer surface of the rotor and the inner surface of the stator, and shear forces generated in the gap process the fluid. Many colloid mills with proper adjustment achieve average particle sizes of 0.1-25 microns in the processed fluid. These capabilities render colloid mills appropriate for a variety of applications including colloid and oil/water-based emulsion processing such as that required for cosmetics, mayonnaise, or silicone/silver amalgam formation, to roofing-tar mixing.

An approximation of energy input into the fluid (kW/L/min) can be estimated by measuring the motor energy (kW) and fluid output (L/min). Tip speed is the circumferential distance traveled by the tip of the rotor per unit of time. Tip speed is thus a function of the rotor diameter and the rotational frequency. Tip speed (in meters per minute, for example) may be calculated by multiplying the circumferential distance transcribed by the rotor tip, $2\pi R$, where R is the radius of the rotor (in meters, for example) times the frequency of revolution (in revolutions per minute). A colloid mill, for example, may have a tip speed in excess of 22.9 m/sec (4500 ft/min) and may exceed 40 m/sec (7900 ft/min). For the purposes of this disclosure, the term "high shear" refers to mechanical rotor stator devices (e.g., colloid mills or rotor/stator mixers) that are capable of tip speeds in excess of 5.1 m/sec. (1000 ft/min) and require an external mechanically driven power device to drive energy into the stream of materials to be reacted. For example, in HSD 40, a tip speed in excess of 22.9 m/sec (4500 ft/min) is achievable, and may exceed 40 m/sec (7900 ft/min). In some embodiments, HSD 40 is capable of delivering at least 300 L/h with a power consumption of about 1.5 kW at a nominal tip speed of at least 22.9 m/sec (4500 ft/min).

HSD 40 combines high tip speeds with a very small shear gap to produce significant shear on the material being processed. The amount of shear will be dependent on the viscosity of the fluid. Accordingly, a local region of elevated pressure and temperature is created at the tip of the rotor during operation of the high shear device. In some cases the locally elevated pressure is about 1034.2 MPa (150,000 psi). In some cases the locally elevated temperature is about 500° C. In some cases these local pressure and temperature elevations may persist for nano or pico seconds. In some embodiments, the energy expenditure of the high shear mixer is greater than 1000 W/m$^3$. In embodiments, the energy expenditure of HSD 40 is in the range of from about 3000 W/m$^3$ to about 7500 W/m$^3$. The shear rate is the tip speed divided by the shear gap width (minimal clearance between the rotor and stator). The shear rate generated in HSD 40 may be greater than 20,000 s$^{-1}$. In some embodiments the shear rate is at least 1,600,000

$s^{-1}$. In embodiments, the shear rate generated by HSD 40 is in the range of from 20,000 $s^{-1}$ to 100,000 $s^{-1}$. For example, in one application the rotor tip speed is about 40 m/sec (7900 ft/min) and the shear gap width is 0.0254 mm (0.001 inch), producing a shear rate of 1,600,000 $s^{-1}$. In another application the rotor tip speed is about 22.9 m/sec (4500 ft/min) and the shear gap width is 0.0254 mm (0.001 inch), producing a shear rate of about 902,000 $s^{-1}$.

HSD 40 is capable of highly mixing the reactants and liquid media, some of which would normally be immiscible, at conditions such that at least a portion of the monomer reacts to produce a polymerization product. In some embodiments, HSD 40 comprises a colloid mill. Suitable colloidal mills are manufactured by IKA® Works, Inc. Wilmington, N.C. and APV North America, Inc. Wilmington, Mass., for example. In some instances, HSD 40 comprises the Dispax Reactor® of IKA® Works, Inc. Several models are available having various inlet/outlet connections, horsepower, nominal tip speeds, output rpm, and nominal flow rate. Selection of a particular device will depend on specific throughput requirements for the intended application, and on the desired particle size in the outlet dispersion from the high shear mixer. In some embodiments, selection of the appropriate mixing tools (generators) within HSD 40 may allow for catalyst size reduction/increase in catalyst surface area.

The high shear device comprises at least one revolving element that creates the mechanical force applied to the reactants. The high shear device comprises at least one stator and at least one rotor separated by a clearance. For example, the rotors may be conical or disk shaped and are separated from a complementary-shaped stator comprising a plurality of circumferentially-spaced high shear openings. For example, the rotors may be conical or disk shaped and may be separated from a complementary-shaped stator; both the rotor and stator may comprise a plurality of circumferentially-spaced teeth. In some embodiments, the stator(s) are adjustable to obtain the desired gap between the rotor and the stator of each generator (rotor/stator set). Grooves in the rotor and/or stator may change directions in alternate stages for increased turbulence. Each generator may be driven by any suitable drive system configured for providing the necessary rotation.

In some embodiments, the minimum clearance between the stator and the rotor is in the range of from about 0.0254 millimeter to about 3.175 millimeter (0.001 inch to about 0.125 inch). In certain embodiments, the minimum clearance between the stator and rotor is about 1.524 millimeter (0.060 inch). In certain configurations, the minimum clearance between the rotor and stator is at least 1.778 millimeter (0.07 inch). The shear rate produced by the high shear mixer may vary with longitudinal position along the flow pathway. In some embodiments, the rotor is set to rotate at a speed commensurate with the diameter of the rotor and the desired tip speed. In some embodiments, the colloidal mill has a fixed clearance between the stator and rotor. Alternatively, the colloid mill has adjustable clearance.

In some embodiments, HSD 40 comprises a single stage dispersing chamber (i.e., a single rotor/stator combination, a single generator). In some embodiments, high shear device 40 is a multiple stage inline colloid mill and comprises a plurality of generators. In certain embodiments, HSD 40 comprises at least two generators. In other embodiments, high shear device 40 comprises at least 3 high shear generators. In some embodiments, high shear device 40 is a multistage mixer whereby the shear rate (which varies proportionately with tip speed and inversely with rotor/stator gap) varies with longitudinal position along the flow pathway, as further described herein below.

In some embodiments, each stage of the external high shear device has interchangeable mixing tools, offering flexibility. For example, the DR 2000/4 Dispax Reactor® of IKA® Works, Inc. Wilmington, N.C. and APV North America, Inc. Wilmington, Mass., comprises a three stage dispersing module. This module may comprise up to three rotor/stator combinations (generators), with choice of fine, medium, coarse, and super-fine for each stage. This allows for creation of dispersions having a narrow distribution of the desired particle size. In some embodiments, each of the stages is operated with super-fine generator. In some embodiments, at least one of the generator sets has a rotor/stator minimum clearance of greater than about 5.08 mm (0.20 inch). In some embodiments, at least one of the generator sets has a minimum rotor/stator clearance of greater than about 1.778 mm (0.07 inch). In some embodiments the rotors are 60 mm and the stators are 64 mm in diameter, providing a clearance of about 4 mm.

Figure 2:
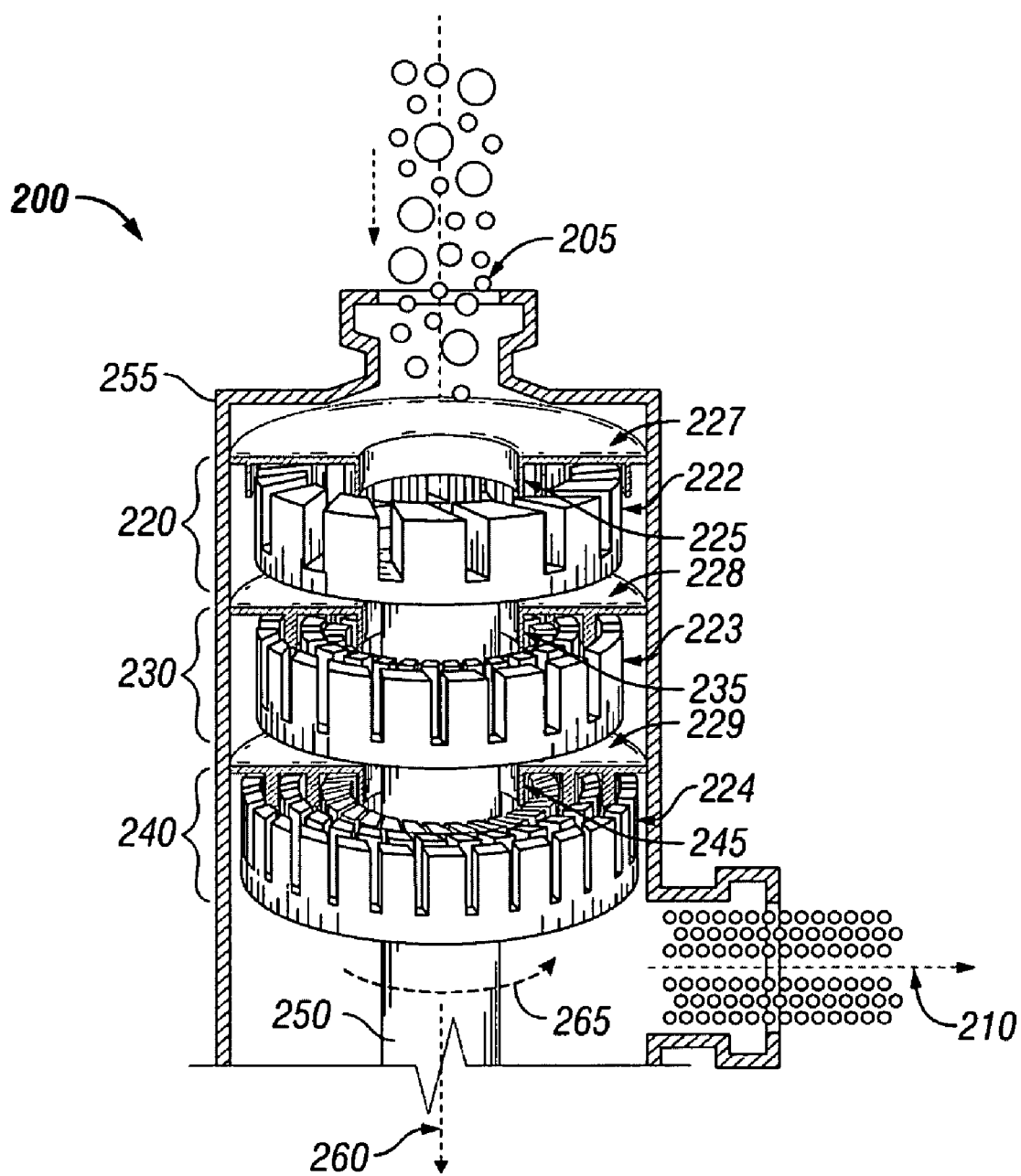
FIG. 2 is a longitudinal cross-section view of a multi-stage high shear device, as employed in an embodiment of the system of FIG. 1.

Referring now to FIG. 2, there is presented a longitudinal cross-section of a suitable high shear device 200. High shear device 200 is a dispersing device comprising three stages or rotor-stator combinations, 220, 230, and 240. Three rotor/stator sets or generators 220, 230, and 240 are aligned in series along drive input 250. The first generator 220 comprises rotor 222 and stator 227. The second generator 230 comprises rotor 223, and stator 228; the third generator 240 comprises rotor 224 and stator 229. For each generator the rotor is rotatably driven by input 250 and rotates, as indicated by arrow 265, about axis 260. Stator 227 is fixedly coupled to high shear device wall 255. Each generator has a shear gap which is the distance between the rotor and the stator. First generator 220, comprises a first shear gap 225; second generator 230 comprises a second shear gap 235; and third generator 240 comprises a third shear gap 245. In some embodiments, shear gaps 225, 235, 245 are between about 0.025 mm and 10.0 mm wide. In some embodiments, the process comprises utilization of a high shear device 200 wherein the gaps 225, 235, 245 are between about 0.5 mm and about 2.5 mm. In certain instances the gap is maintained at about 1.5 mm. Alternatively, the gaps 225, 235, 245 are different for generators 220, 230, 240. In certain instances, the gap 225 for the first generator 220 is greater than about the gap 235 for the second generator 230, which is in turn greater than about the gap 245 for the third generator. As mentioned above, the generators of each stage may be interchangeable, offering flexibility.

Generators 220, 230, and 240 may comprise a coarse, medium, fine, and super-fine characterization. Rotors 222, 223, and 224 and stators 227, 228, and 229 may be toothed designs. Each generator may comprise two or more sets of rotor-stator teeth. Rotors 222, 223, and 224 may comprise a number of rotor teeth circumferentially spaced about the circumference of each rotor. Stators 227, 228, and 229 may comprise a number of complementary stator teeth circumferentially spaced about the circumference of each stator. In embodiments, the inner diameter of the rotor is about 11.8 cm. In embodiments, the outer diameter of the stator is about 15.4 cm. In certain embodiments, each of three stages is operated with a super-fine generator, comprising a shear gap of between about 0.025 mm and about 3 mm. For applications in which solid particles are to be sent through high shear device 200, shear gap width may be selected for reduction in particle size and increase in particle surface area. In some embodiments, the disperser is configured so that the shear rate will increase stepwise longitudinally along the direction of the flow. The IKA® model DR 2000/4, for example, comprises a belt drive, 4M generator, PTFE sealing ring, inlet flange 25.4 mm (1 inch) sanitary clamp, outlet flange 19 mm (¾ inch) sanitary clamp, 2HP power, output speed of 7900 rpm, flow capacity (water) approximately 300-700 L/h (depending on generator), a tip speed of from 9.4-41 m/sec (1850 ft/min to 8070 ft/min).

Reactor/Vessel. Vessel or reactor 10 is any type of vessel in which a multiphase reaction can be propagated to carry out the above-described conversion reaction(s). For instance, vessel 10 may be a continuous or semi-continuous stirred tank reactor, or it may comprise one or more batch reactors arranged in series or in parallel. In other embodiments, vessel 10 may be a tower reactor, a tubular reactor or multi-tubular reactor. One or more line 15 may be connected to vessel 10 for introducing monomer, solvent, initiator or catalyst, or other material, as desired for particular applications.

Vessel 10 may include one or more of the following items: stirring system, heating and/or cooling capabilities, pressure measurement instrumentation, temperature measurement instrumentation, one or more injection points, and level regulator (not shown), as are known in the art of reaction vessel design. For example, a stirring system may include a motor driven mixer. A heating and/or cooling apparatus may comprise, for example, a heat exchanger. Alternatively, as much of the polymerization reaction may occur within HSD 40, in some embodiments, vessel 10 may serve primarily as a storage vessel in some cases. Although generally less desired, in some applications vessel 10 may be omitted, particularly if multiple high shear mixers/reactors are employed in series, as further described below. Line 16 is connected to vessel 10 for withdrawal or removal of the polyvinyl chloride product.

Heat Transfer Devices. In addition to the above-mentioned heating/cooling capabilities of vessel 10, other external or internal heat transfer devices for heating or cooling a process stream are also contemplated in variations of the embodiments illustrated in FIG. 1. Some suitable locations for one or more such heat transfer devices are between pump 5 and HSD 40, between HSD 40 and vessel 10, and between vessel 10 and pump 5 when system 1 is operated in multi-pass mode. Some non-limiting examples of such heat transfer devices are shell, tube, plate, and coil heat exchangers, as are known in the art.

Pumps. Pump 5 is configured for either continuous or semi-continuous operation, and may be any suitable pumping device that is capable of providing greater than 203 kPa (2 atm) pressure, preferably greater than 304 kPa (3 atm) pressure, to allow controlled flow through HSD 40 and system 1. For example, a Roper Type 1 gear pump, Roper Pump Company (Commerce Ga.) Dayton Pressure Booster Pump Model 2P372E, Dayton Electric Co (Niles, Ill.) is one suitable pump. Preferably, all contact parts of the pump comprise stainless steel. If corrosive substances are to be pumped it may be desirable to provide gold plated contact surfaces. In some embodiments of the system, pump 5 is capable of pressures greater than about 2027 kPa (20 atm). In addition to pump 5, one or more additional, high pressure pumps (not shown) may be included in the system illustrated in FIG. 1. For example, a booster pump, which may be similar to pump 5, may be included between HSD 40 and vessel 10 for boosting the pressure into vessel 10. As another example, a supplemental feed pump, which may be similar to pump 5, may be included in line 15 for introducing additional monomer, solvent, initiator or catalyst into vessel 10. In some embodiments, line 16 may be joined to line 21 for multi-pass operation, as further described herein below. As still another example, a compressor type pump may be positioned between line 17 and HSD 40 for recycling unreacted gases from vessel 10 to an inlet of the high shear device.

Process for Production of Polyvinyl Chloride

In operation for the production of polyvinyl chloride by free radical polymerization of vinyl chloride, a stream of liquid vinyl chloride monomer is introduced into system 1 via line 21, is pumped through 13 and fed into HSD 40. An initiator or catalyst stream introduced via line 22 is combined with the monomer in line 13. The initiator or catalyst may be dissolved or suspended in monomer or in an aqueous or nonaqueous solvent. Alternatively, the initiator stream may be fed directly into HSD 40 instead of being combined with the monomer in line 13.

The process may be operated in either continuous or semi-continuous flow mode, or it may be operated in batch mode. Pump 5 is operated to pump the liquid reactant (monomer solution) from line 21, and to build pressure and feed HSD 40, providing a controlled flow through line 13 and high shear mixer (HSD) 40, and throughout high shear system 1. In some embodiments, pump 5 increases the pressure of the monomer stream to greater than 203 kPa (2 atm), preferably greater than about 304 kPa (3 atm). In some applications, pressures greater than about 2027 kPa (20 atm) may be used to accelerate reactions, with the limiting factor being the pressure limitations of the selected pump 5 and high shear mixer 40. The solution in line 13 comprises vinyl chloride monomer, and, optionally, an aqueous or non-aqueous solvent, for the free radical polymerization of the vinyl chloride, facilitated by an initiator or catalyst, to form polyvinyl chloride.

Alternatively, the vinyl chloride and solvent may be initially introduced into vessel 10 via one or more feed line 15, and, after being mixed, are fed into line 21. The contents of vessel 10 are maintained at a specified bulk reaction temperature using suitable heating and/or cooling capabilities (e.g., cooling coils) and temperature measurement instrumentation. For example, since vinyl chloride exists as a gas at ambient temperature and pressure, system 1 may be sufficiently pressurized to maintain the vinyl chloride monomer in solution or in liquid phase at a given temperature. Pressure in the vessel may be monitored using suitable pressure measurement instrumentation, and the level of reactants in the vessel may be controlled using a level regulator (not shown), employing techniques that are known to those of skill in the art. The contents are stirred or circulated continuously or semi-continuously.

Initiator. A solution containing a suitable polymerization initiator, or a catalyst, dissolved in a suitable aqueous or non-aqueous solvent, is combined with the monomer stream in line 13, by introduction through line 22. In some embodiments, the free radical initiator is an organic peroxide compound such as t-butyl hydroperoxide, lauroyl peroxide, benzoyl peroxide or isopropylperoxy dicarbonate, for example. If a solid catalyst is employed, it may be introduced via line 22 as a slurry in a suitable aqueous or non-aqueous solvent. In some embodiments, the selected mixing tools (i.e., rotor/stator sets or generators) in HSD 40 are selected for catalyst size reduction and/or increase in catalyst surface area.

In some embodiments, monomer solution is continuously pumped into line 13 to form the high shear mixer feed stream. Additional solvent may be introduced into line 13, and, in some embodiments, monomer solution or solvent may be introduced independently into HSD 40. The actual ratio of the raw materials used is determined based on the desired selectivity and operating temperatures and pressures. Pressure is preferably kept high enough to keep the monomer in solution. For the purposes of this disclosure, the terms "superficial pressure" and "superficial temperature" refer to the apparent, bulk, or measured pressure or temperature, respectively, in a vessel, conduit or apparatus of the system. The actual temperatures and/or pressures at which the reactants make contact and react in the microenvironment of a transient cavity produced by the hydrodynamic forces of the high shear mixer may be quite different, as further discussed elsewhere herein. For bulk polymerization embodiments, 100% monomer may be used. Alternatively, the liquid vinyl chloride stream may also include a suitable solvent. In solution polymerization an organic solvent is used, and in emulsion polymerization the ingredients may be predispersed to make an emulsion, and polymerization occurs in the colloidal emulsion. Accordingly, in some embodiments the reaction may comprise a homogeneous liquid phase reaction in which the vinyl chloride monomer and an aqueous initiator solution are in the form of a very fine emulsion.

After pumping, the initiator and monomer liquid phase are mixed within HSD 40, which provides superior dissolution into solution and/or enhancement of reactant mixing. In some embodiments it may create a fine mixture, emulsion or dispersion of the reactants, which may also include catalyst and/or an otherwise immiscible solvent. As used herein, the term "dispersion" refers to a liquefied mixture that contains two distinguishable substances (or phases) that will not readily mix and dissolve together. A dispersion comprises a continuous phase (or matrix), which holds therein discontinuous droplets, bubbles, and/or particles of the other phase or substance. The term dispersion may thus refer to foams comprising gas bubbles suspended in a liquid continuous phase, emulsions in which droplets of a first liquid are dispersed throughout a continuous phase comprising a second liquid with which the first liquid is immiscible, and continuous liquid phases throughout which solid particles are distributed. The term "dispersion" encompasses continuous liquid phases throughout which gas bubbles are distributed, continuous liquid phases throughout which solid particles (e.g., solid catalyst) are distributed, continuous phases of a first liquid throughout which droplets of a second liquid that is substantially insoluble in the continuous phase are distributed, and liquid phases throughout which any one or a combination of solid particles, immiscible liquid droplets, and gas bubbles are distributed. Hence, a dispersion can exist as a homogeneous mixture in some cases (e.g., liquid/liquid phase), or as a heterogeneous mixture (e.g., gas/liquid, solid/liquid, or gas/solid/liquid), depending on the nature of the materials selected for combination.

In some embodiments, nanoparticles and microparticles containing catalyst or another immiscible component are formed by HSD 40. For example, disperser IKA® model DR 2000/4, a high shear, three stage dispersing device configured with three rotors in combination with stators, aligned in series, is used to create a dispersion of catalyst in liquid medium comprising monomer and any initiators (i.e., "the reactants"). The rotor/stator sets may be configured as illustrated in FIG. 2, for example. For some applications, the direction of rotation of the generators may be opposite that shown by arrow 265 (e.g., clockwise or counterclockwise about axis of rotation 260). The combined reactants entering the high shear mixer via line 13 proceed to a first stage rotor/stator combination having circumferentially spaced first stage shear openings. In some applications, the direction of flow of the reactant stream entering inlet 205 corresponds to the axis of rotation 260. The coarse dispersion exiting the first stage enters the second rotor/stator stage, having second stage shear openings. The reduced particle-size dispersion emerging from the second stage enters the third stage rotor/stator combination having third stage shear openings. The dispersion exits the high shear mixer via line 19. In some embodiments, the shear rate increases stepwise longitudinally along the direction of the flow. For example, in some embodiments, the shear rate in the first rotor/stator stage is greater than the shear rate in subsequent stage(s). In other embodiments, the shear rate is substantially constant along the direction of the flow, with the stage or stages being the same. If the high shear mixer includes a PTFE seal, for example, the seal may be cooled using any suitable technique that is known in the art. For example, the reactant stream flowing in line 13 may be used to cool the seal and in so doing be preheated as desired prior to entering the high shear mixer.

The rotor of HSD 40 is set to rotate at a speed commensurate with the diameter of the rotor and the desired tip speed (e.g., in the range of about 9.4-41 m/sec (about 1850 ft/min to about 8070 ft/min)). As described above, the high shear mixer (e.g., colloid mill) has either a fixed clearance between the stator and rotor or has adjustable clearance. HSD 40 serves to intimately mix the reactants. In some embodiments of the process, the transport resistance of the reactants is reduced by operation of the high shear mixer such that the velocity of the polymerization reaction is increased by greater than a factor of 5. In some embodiments, the velocity of the reaction is increased by at least a factor of 10. In some embodiments, the velocity is increased by a factor in the range of about 10 to about 100 fold. In some embodiments, HSD 40 delivers at least 300 L/h with a power consumption of 1.5 kW at a nominal tip speed of at least 22.9 m/sec (4500 ft/min), and which may exceed 40 m/sec (7900 ft/min). In some embodiments, the mixture is subjected to a shear rate greater than 20,000 $s^{-1}$.

Although measurement of instantaneous temperature and pressure at the tip of a rotating shear unit or revolving element in HSD 40 is difficult, it is estimated that the localized temperature seen by the intimately mixed reactants is in excess of 500° C. and at pressures in excess of 5000 kPa (50 atm) under cavitation conditions. When an immiscible solid (e.g., catalyst) or immiscible liquid (e.g., aqueous solvent) is present, the high shear mixing results in dispersion of the catalyst or aqueous solvent in micron or submicron-sized particles (i.e., mean diameter less than one micron). In some embodiments, the resultant dispersion has an average droplet or particle size less than about 1.5 µm. In some embodiments, the average size is less than one micron in diameter. In some embodiments, the mean droplet or particle size is in the range of about 0.4 µm to about 1.5 µm. In some embodiments, the mean droplet or particle size is less than about 400 nm, in the range of about 200 nm to about 400 nm, or is about 100 nm in some cases. Without wishing to be limited by theory, it is believed that sub-micron particles or bubbles dispersed in a liquid undergo movement primarily through Brownian motion effects. The bubbles in the product dispersion created by HSD 40 may have greater mobility through boundary layers of catalyst particles, if present, thereby facilitating and accelerating the polymerization reaction through enhanced transport of reactants.

For the purposes of this disclosure, a nanodispersion is a dispersion of immiscible liquid-liquid phases or heterogeneous solid-liquid phases in which the sizes of the droplets or particles in the dispersed phase are less than 1000 nanometers (i.e., <1 micron). A nanodispersion is sometimes also referred to herein as a "dispersion." In many embodiments, the nanodispersion is able to remain dispersed at atmospheric pressure for at least 15 minutes.

The resulting high shear mixture exits HSD 40 via line 19 and feeds into vessel 10, as illustrated in FIG. 1, wherein polymerization occurs or continues to take place. If desired, the high shear mixture may be further processed prior to entering vessel 10. For example, further mixing in one or more successive high shear mixing devices, similar to HSD 40 with the same or different generator configurations, may be performed before the process stream enters reactor/vessel 10. If desired, one or more additives may be injected at line 13 or 18, or any other suitable point in the process, or as illustrated in the flow diagram shown in FIG. 1. In some embodiments, a homogeneous free radical polymerization reaction takes place. In some other embodiments, a heterogeneous reaction takes place in which the intimately mixed monomer solution and finely divided catalyst, or immiscible initiator solution, are in the form of a highly dispersed liquid or nanoemulsion.

In some embodiments, as a result of the intimate mixing of the reactants prior to entering reactor 10, a significant portion of the chemical reaction may take place in HSD 40, with or without the presence of catalyst. Polymerization of monomer to the corresponding polymer will occur whenever suitable time, temperature and pressure conditions exist, facilitated in some cases by the presence of the catalyst and/or initiator. In this sense the polymerization of monomer may occur at any point in the flow diagram of FIG. 1 if temperature and pressure conditions are suitable. The polymerization reaction may take place in the high shear mixer to a significant extent. A discrete reactor is usually desirable, however, to allow for increased residence time, agitation and heating and/or cooling of the bulk reactants. Accordingly, in some embodiments, reactor/vessel 10 may be used primarily for heating and separation of volatile reaction products (i.e., vent gas) from the polymerization product. Alternatively, or additionally, vessel 10 may serve as a primary reaction vessel where most of the polymer is produced. For example, the process may be operated as a single pass or "once through" process in order to minimize subjecting the formed polymer to shearing, in which case vessel 10 may serve as the primary reaction vessel. Vessel/reactor 10 may be operated in either continuous or semi-continuous flow mode, or it may be operated in batch mode.

As mentioned above, the contents of vessel 10 may be maintained at a specified reaction temperature using heating and/or cooling capabilities (e.g., cooling coils) and temperature measurement instrumentation. Pressure in the vessel may be monitored using suitable pressure measurement instrumentation, and the level of reactants in the vessel may be controlled using a level regulator (not shown), employing techniques that are known to those of skill in the art. The contents are stirred continuously or semi-continuously. The bulk or global operating temperature of the reactants is desirably maintained below their flash points. In some embodiments, the operating conditions of system 1 comprise a temperature in the range of from about 20° C. to about 230° C. In some embodiments, the temperature is less than about 200° C. In some embodiments, the temperature is in the range of from about 160° C. to 180° C. In specific embodiments, the reaction temperature in vessel 10, in particular, is in the range of from about 155° C. to about 160° C. In some embodiments the process is operated at ambient temperature. In some embodiments, the reaction pressure in vessel 10 is in the range of from about 203 kPa to about 6080 kPa (about 2 atm to about 55-60 atm). In some embodiments, reaction pressure is in the range of from about 811 kPa to about 1520 kPa) (about 8 atm to about 15 atm). In some embodiments, the reaction pressure is less than 600 kPa (6 atm). The superior dissolution and/or dispersion provided by the external high shear mixing potentially allows a decrease in operating pressure while maintaining or even increasing reaction rate. Operating the polymerization process at decreased pressure potentially decreases wear of the materials constituting the reactors, the piping, and the mechanical parts of the plant, as well as the ancillary devices, in some embodiments of the high shear enhanced polymerization process.

The polymerization product may be produced either continuously, semi-continuously or batch wise, as desired, and is removed from system 1 via product line 16. In some embodiments, more than one reactor product line 16 is used to remove the product. Vent gas, containing unconverted gaseous vinyl chloride and any volatile side reaction products, for example, exit reactor 10 via line 17. The product stream comprising polyvinyl chloride and dissolved, unconverted monomer exits reactor 10 by line 16. In some embodiments, the content of unconverted vinyl chloride in this product stream is reduced compared to that of conventional PVC production methods. In some embodiments the product stream is further processed. For example, the content of unconverted monomer in the product stream may be reduced using suitable techniques as are known. The polymerized PVC granules may be filtered or centrifuged out, in the case of solution polymerization, and the unpolymerized liquid monomer recycled through the high shear mixing device. In the case of bulk polymerization, the residual vinyl chloride monomer may be stripped off and recycled through the high shear mixing device. The PVC product may be used to manufacture any of a wide variety of commercial products. For instance, it may serve as the raw material for making clothing, upholstery, plumbing pipe, vinyl flooring and other building materials. The vent gas may be further treated and vented, or its components may be recycled, as desired, using known techniques.

Multiple Pass Operation. Referring still to FIG. 1, the system is configured for either single pass or multi-pass operation, wherein, after the initial preparation of the monomer-solvent solution in vessel 10 and commencement of the process, the output from line 16 of vessel 10 goes directly to recovery of the polymer product or to further processing. In some embodiments it may be desirable to pass the contents of vessel 10, or a portion thereof containing unreacted monomer solution, through HSD 40 during a second pass. In this case, all or a portion of the output from vessel 10 may be returned by connecting line 16 to line 21 or line 13, for further dispersion and reaction in HSD 40. Additional initiator or catalyst slurry may be injected via line 22 into line 13, or it may be added directly into the high shear mixer (not shown), if needed. Additional solvent or monomer may be injected at line 21, as needed, for a particular application.

Multiple High Shear Mixing Devices. In some embodiments, two or more high shear devices like HSD 40, or configured differently, are aligned in series, and are used to further enhance the reaction. Their operation may be in either batch or continuous mode. In some instances in which a single pass or "once through" process is desired, the use of multiple high shear devices in series may also be advantageous. For instance, in some applications, where low density product containing shorter polymer chains is desired, the product may be recycled via line 21, to pump 5, and through high shear mixer 40, before returning via line 18 to vessel 10. In some embodiments where multiple high shear devices are operated in series, vessel 10 may be omitted. When multiple high shear devices are operated in series, additional reactant(s) may be injected into the inlet feed stream of each device. In some embodiments, multiple high shear devices 40 are operated in parallel, and the outlet dispersions therefrom are introduced into one or more vessel 10.

The application of enhanced mixing of the reactants by HSD 40 potentially causes greater polymerization of the monomer in some embodiments of the process. In some embodiments, the enhanced mixing potentiates an increase in throughput of the process stream. In some embodiments, the high shear mixing device is incorporated into an established process, thereby enabling an increase in production (i.e., greater throughput). In contrast to some existing methods that attempt to increase the degree of polymerization by increasing reactor pressures, the superior dissolution and/or dispersion provided by external high shear mixing may allow in many cases a decrease in overall operating pressure while maintaining or even increasing the polymerization rate. Without wishing to be limited to a particular theory, it is believed that the level or degree of high shear mixing is sufficient to increase rates of mass transfer and may also produce localized non-ideal conditions that enable reactions to occur that might not otherwise be expected to occur based on Gibbs free energy predictions. Localized non ideal conditions are believed to occur within the high shear device resulting in increased temperatures and pressures with the most significant increase believed to be in localized pressures. The increase in pressures and temperatures within the high shear device are instantaneous and localized and quickly revert back to bulk or average system conditions once exiting the high shear device. In some cases, the high shear mixing device induces cavitation of sufficient intensity to dissociate one or more of the reactants into free radicals, which may intensify a chemical reaction or allow a reaction to take place at less stringent conditions than might otherwise be required. Cavitation may also increase rates of transport processes by producing local turbulence and liquid micro-circulation (acoustic streaming). An overview of the application of cavitation phenomenon in chemical/physical processing applications is provided by Gogate et al., "Cavitation: A technology on the horizon," *Current Science* 91 (No. 1): 35-46 (2006). The high shear mixing device of certain embodiments of the present system and methods is operated under what is believed to be cavitation conditions effective to dissociate the initiator and monomers into free radicals, which then react to form the polymer.

In some embodiments, use of an above-described high shear process allows for greater catalyzed polymerization of monomer to polymerization product and/or an increase in throughput of the reactants. In some embodiments, an external high shear mixing device is incorporated into an established process, thereby making possible an increase in production compared to the process operated without the high shear mixing of the reactants. In some embodiments, a disclosed process or system makes possible the design of a smaller and/or less capital intensive process than previously possible without the incorporation of the external high shear mixing device. In some embodiments, the application of a disclosed method potentially reduces operating costs/increases production from an existing process. In certain embodiments, the use of a disclosed method may reduce capital costs for the design of new polymerization processes. Still other potential benefits of some embodiments of the system and method for the production of polyvinyl chloride include, but are not limited to, faster cycle times, increased throughput, higher monomer conversion, reduced operating costs and/or reduced capital expense due to the possibility of designing smaller reactors and/or operating the polymerization process at lower temperature and/or pressure. In some embodiments, a polymerization method is provided for the production of polyvinyl chloride, without the need for large volume reactors and without the need to recover substantial amounts of unconverted monomer.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of broader terms such as comprises, includes, having, etc. should be understood to provide support for narrower terms such as consisting of, consisting essentially of, comprised substantially of, and the like.

Accordingly, the scope protection is not limited by the description set out above but is only limited by the claims which follow, that scope including all equivalents of the subject matter of the claims. Each and every original claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

What is claimed is:

1. A method of producing polyvinyl chloride, the method comprising:
    obtaining a high shear mixing device comprising an enclosure enclosing a rotor/stator set comprising a rotor tip, wherein said rotor/stator set is configured to provide a rotor tip speed of at least 5.1 in/sec (1,000 ft/min);
    high shear mixing a vinyl chloride solution with an initiator solution in the high shear mixing device at said rotor tip speed such that a significant portion of polymerization occurs therein to form a polymerization mixture comprising polyvinyl chloride, the polymerization mixture comprising an emulsion having droplets with a mean diameter of less than about 1 micron; and
    continuously passing said polymerization mixture from said high shear mixing device into a vessel from which polyvinyl chloride is removed.

2. The method of claim 1, wherein said polymerization mixture is subjected to a temperature in the range of about 20° C. to about 230° C.

3. The method of claim 1, wherein said high shear mixing comprises a shear rate of at least 20,000 s$^{-1}$.

4. The method of claim 3, wherein said shear rate is in the range of about 20,000 s$^{-1}$ to about 1,600,000 s$^{-1}$.

5. The method of claim 3, wherein said shear rate is at least 900,000 s$^{-1}$.

6. The method of claim 3, wherein said shear rate is at least 100,000 s$^-$.

7. The method of claim 1, wherein said high shear mixing produces a local pressure of at least about 1,034 MPa at said tip.

8. The method of claim 1, wherein said polymerization occurs at a velocity at least 5 fold greater than that of a similar method in which the vinyl chloride solution and the initiator are not mixed at said tip speed.

9. The method of claim 1, wherein said mean diameter is less than 400 nm.

10. The method of claim 1, wherein said mean diameter is in the range of about 200 to 400 nm.

11. The method of claim 1, wherein said mean diameter is about 100 nm.

12. The method of claim 1 wherein the high shear mixing device comprises at least two rotor/stator sets.

13. The method of claim 12 wherein the shear rate provided by a first rotor/stator set of the at least two rotor/stator sets is different from that of a second rotor/stator set.

* * * * *